(12) United States Patent
Akens et al.

(10) Patent No.: US 11,101,505 B2
(45) Date of Patent: Aug. 24, 2021

(54) BATTERY PACK INTERFACE

(71) Applicant: MOTOROLA SOLUTIONS, INC., Chicago, IL (US)

(72) Inventors: Jody H Akens, Weston, FL (US); William B Kiger, Flowery Branch, GA (US); Kevin K Maggert, Dacula, GA (US); Timothy Brand, Loganville, GA (US); William Robertson, Pompano Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 295 days.

(21) Appl. No.: 16/456,668

(22) Filed: Jun. 28, 2019

(65) Prior Publication Data
US 2020/0411912 A1 Dec. 31, 2020

(51) Int. Cl.
*H01M 10/42* (2006.01)
*H01M 50/213* (2021.01)

(52) U.S. Cl.
CPC ..... *H01M 10/4257* (2013.01); *H01M 50/213* (2021.01); *H01M 2010/4271* (2013.01)

(58) Field of Classification Search
CPC ................................................ H01M 10/4257
See application file for complete search history.

(56) References Cited

U.S. PATENT DOCUMENTS

| 5,607,791 | A | 3/1997 | Garcia et al. |
| 5,910,380 | A | 6/1999 | Taraboulos et al. |
| 7,381,086 | B1 | 6/2008 | Gilmore et al. |
| 8,150,476 | B2 | 4/2012 | Crawford et al. |
| 9,991,619 | B1 | 6/2018 | Kee et al. |
| 2004/0201363 | A1* | 10/2004 | Mathiowetz ......... H01M 50/116 320/112 |
| 2015/0069829 | A1* | 3/2015 | Dulle ................ H01M 10/4257 307/9.1 |
| 2015/0280288 | A1* | 10/2015 | Rajaraman .......... H01M 50/172 429/7 |

* cited by examiner

*Primary Examiner* — Brian R Ohara
(74) *Attorney, Agent, or Firm* — Barbara R. Doutre

(57) ABSTRACT

A battery pack is provided with an improved interface through the use of an endcap which forms a top surface of a battery pack housing. The endcap includes a walled aperture for a connector. The connector along with electronic circuitry is disposed on a printed circuit board located beneath the endcap. A dam of UV glue surrounds a perimeter of the connector preventing the potting compound from intruding into contacts. An endcap perimeter rim of UV glue seals the endcap to the housing. The endcap further includes an injection port and flow directors for guiding a potting compound into the endcap to form a water tight seal.

20 Claims, 5 Drawing Sheets

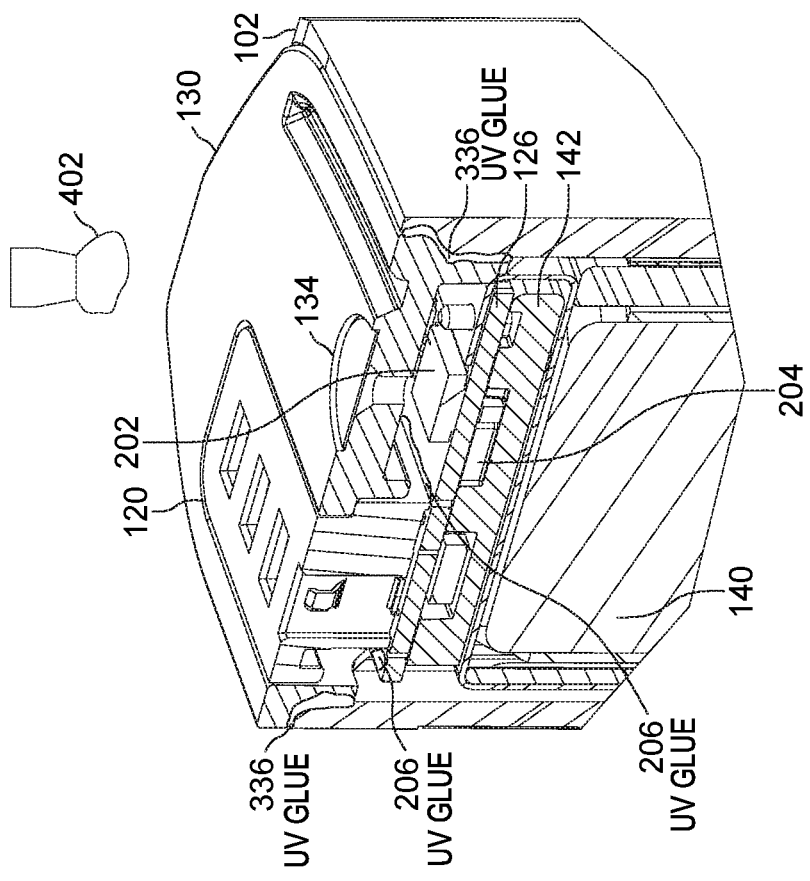
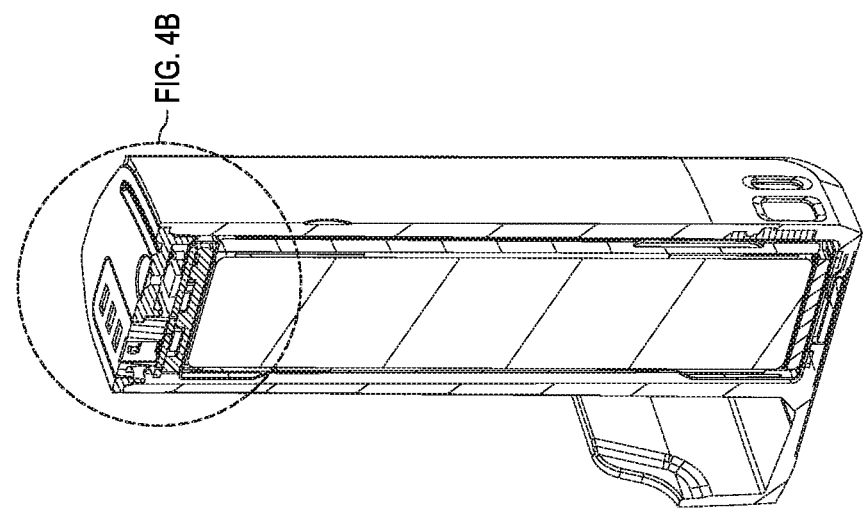
FIG. 4B
FIG. 4A

BATTERY PACK INTERFACE

FIELD OF THE INVENTION

The present invention relates generally to a battery pack and more particularly to a battery pack interface of a removable battery pack for a portable communication device.

BACKGROUND OF THE INVENTION

Portable communication devices, such as those used in public safety operations, are often powered by a removable battery pack. A battery pack powering a portable public safety two-way radio may be exposed to harsh conditions, such as those encountered during fire rescue or law enforcement operations. It is important to maintain a robust interface between the portable radio and battery pack under extreme temperatures, exposure to water, and/or during drop. Watersealing and impact resistance are important factors to consider. Additionally, the battery interface must be able to handle high currents, such as those associated with a transceiver that occur during push-to-talk (PTT) transmissions.

Accordingly, it is highly desirable to have a robust battery pack with improved battery pack interface.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a cross sectional view of the battery pack of FIG. 1A in accordance with some embodiments.

FIGS. 4A and 4B show cross sectional views of the battery pack of FIG. 1A in accordance with some embodiments.

Figure 1A:
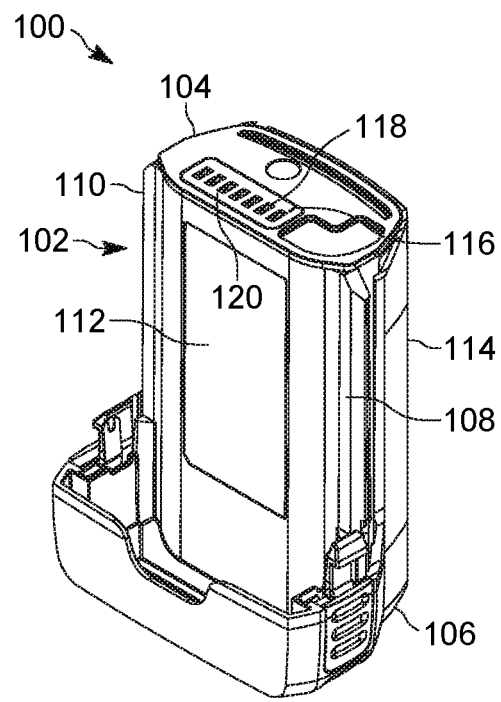
FIG. 1A is a battery pack in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an improved battery pack having a battery pack interface for coupling to a portable communication device, such as a portable public safety communication device. The battery pack provided herein is capable of transferring high power from the battery to the device with suitable robustness for public safety environments. The ability to transfer high current and maintain a robust interface is achieved through the use of an endcap which forms a top surface of the battery pack housing. The endcap includes a walled aperture for a connector, the connector along with electronic circuitry being disposed on a printed circuit board located beneath the endcap. A dam of UV glue surrounds a perimeter of the connector. The walled aperture is sealed to the dam of UV glue surrounding the connector. An endcap perimeter rim of UV glue seals the endcap to the housing. The endcap also includes and injection port and flow directors for guiding a potting compound to form a seal while also preventing the potting compound from intruding into contacts of the connector and cell vents of the battery pack.

FIG. 1A is a battery pack 100 formed in accordance with some embodiments. Battery pack 100 comprises a battery pack housing 102, the housing being formed of a hard plastic and generally comprising a top surface 104, a bottom surface 106, a first side surface 108, a second side surface 110, a front surface 112, and a back surface 114. The battery pack housing encases a battery pack 140, such as the battery pack 140 of FIG. 1B. In accordance with some embodiments, the top surface 104 provides a battery pack interface via a connector 120. The connector 120 comprises a contact receptacle 116 aligned within the housing 102 allowing for exposed spring contacts 118 on the top surface 104. The connector 120 provides two power contacts, two GND contacts, one data contact, and two near field communication (NFC) contacts for interfacing with corresponding mating contacts of a portable communication device (not shown). While the number of contacts may vary depending on the type of device being powered, it is to be appreciated that the connector 120 advantageously allows for the handling of high transceiver currents, while taking up minimum space within the battery pack. The use of a spring contact connector 120 for accommodating a blade connector (on radio side not shown) provides the ability to handle higher current in a smaller footprint than, for example past approaches which have typically not used spring loaded contacts on the battery. While the connector 120 on its own is not sealed (by default), the assembly of the overall interface does provide sealing as will be described later.

Figure 1B:
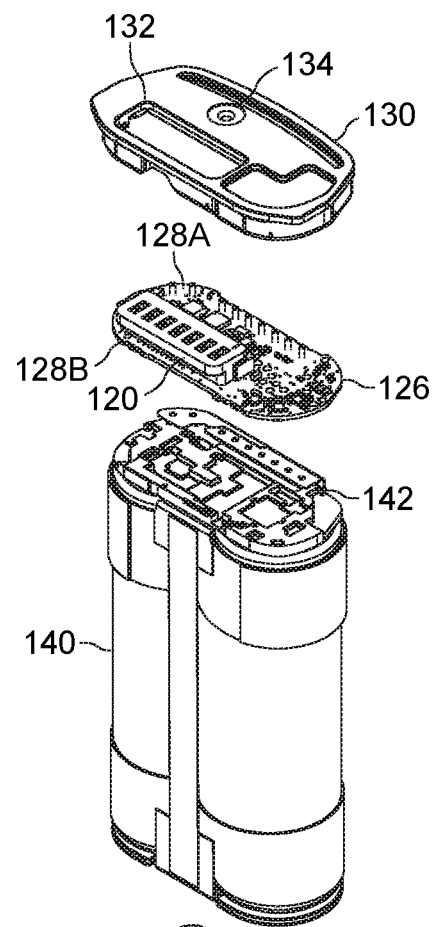
FIG. 1B is an exploded view of the battery pack of FIG. 1A in accordance with some embodiments.
Figure 1B:
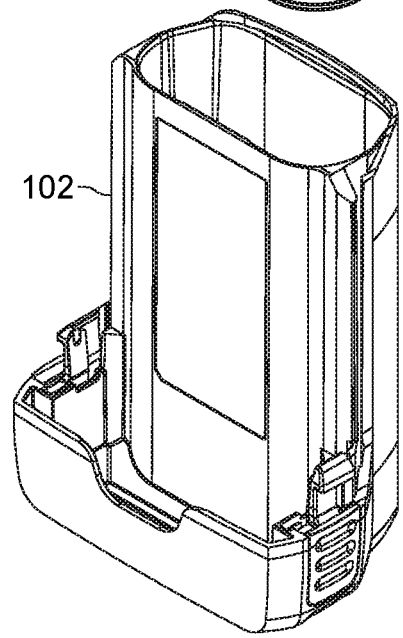

FIG. 1B is an exploded view of the battery pack of FIG. 1A in accordance with some embodiments. This view shows housing 102 with a cell pack 140 removed therefrom, the cell pack being covered by a pad 142 at a top end. A printed circuit board (pcb) 126 includes electronic circuitry disposed upon first and second surfaces 128a, 128b. The pad 142 is situated between the top end of the cell pack and the pcb 126. The pad 142 is shaped to accommodate the electronic circuitry disposed on the second surface 128b of the pcb 126. The pad prevents potting compound from entering vents associated with each cell of the cell pack 140.

An endcap 130, preferably a transparent endcap, forms the top surface 104 of the battery pack 100. The connector 120 comprises the contact receptacle 116 aligned within the housing 102 allowing for exposed spring contacts 118 on the top surface 104 of endcap 130. In accordance with some embodiments, the endcap 130 comprises a walled aperture 132 to accommodate the connector 120 of the pcb 126. As will also be provided in later descriptions this walled aperture also operates as a flow director for potting compound. The transparent endcap 130 is sufficiently transparent to pass ultraviolet (UV) light. The endcap 130 further comprises a fill port 134 for the injection of potting compound.

Figure 2:
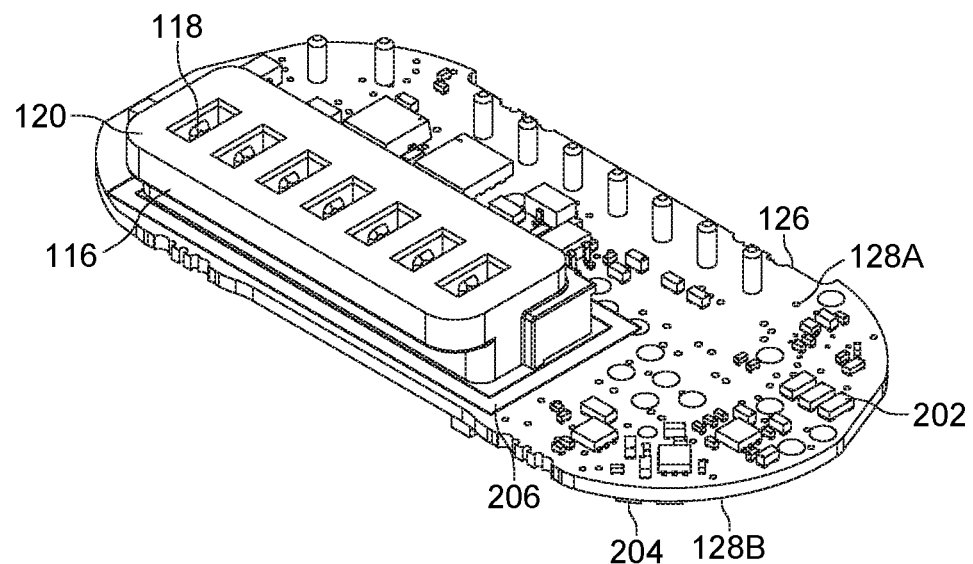
FIG. 2 is a printed circuit board of the battery pack formed in accordance with some embodiments.

FIG. 2 shows the printed circuit board 126 of the battery pack 100 formed in accordance with some embodiments. The pcb 126 comprises first and second surfaces 128a, 128b. The first surface 128a of pcb 126 has electronic circuitry 202 and the connector 120 disposed thereon. The connector 120 comprises the contact receptacle 116 retaining exposed spring contacts 118. The second surface 128b of pcb 126 also has electronic circuitry 204 disposed thereon. The electronic circuitry 202, 204 is electrically coupled to the cell pack 140 of FIG. 1B.

In accordance with some embodiments, a first UV glue is disposed on the pcb 126 forming a dam of UV glue 206 surrounding a perimeter of the connector 120. In accordance with some embodiments, the dam of UV glue 208 has a first viscosity level which holds its as dispensed shape and does not flow into undesirable locations while also preventing later injected potting compound from entering the connector 120. The dam of UV glue 206 has a first viscosity level and comprises a polymer glue having a thickness sufficient to block intrusion of the potting compound within the connector 120.

Figure 3A:
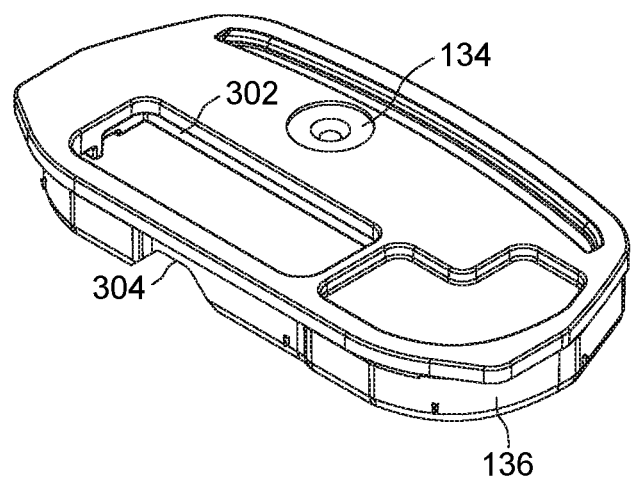
FIGS. 3A and 3B show interior and exterior views of an endcap for the battery pack in accordance with some embodiments.
Figure 3B:
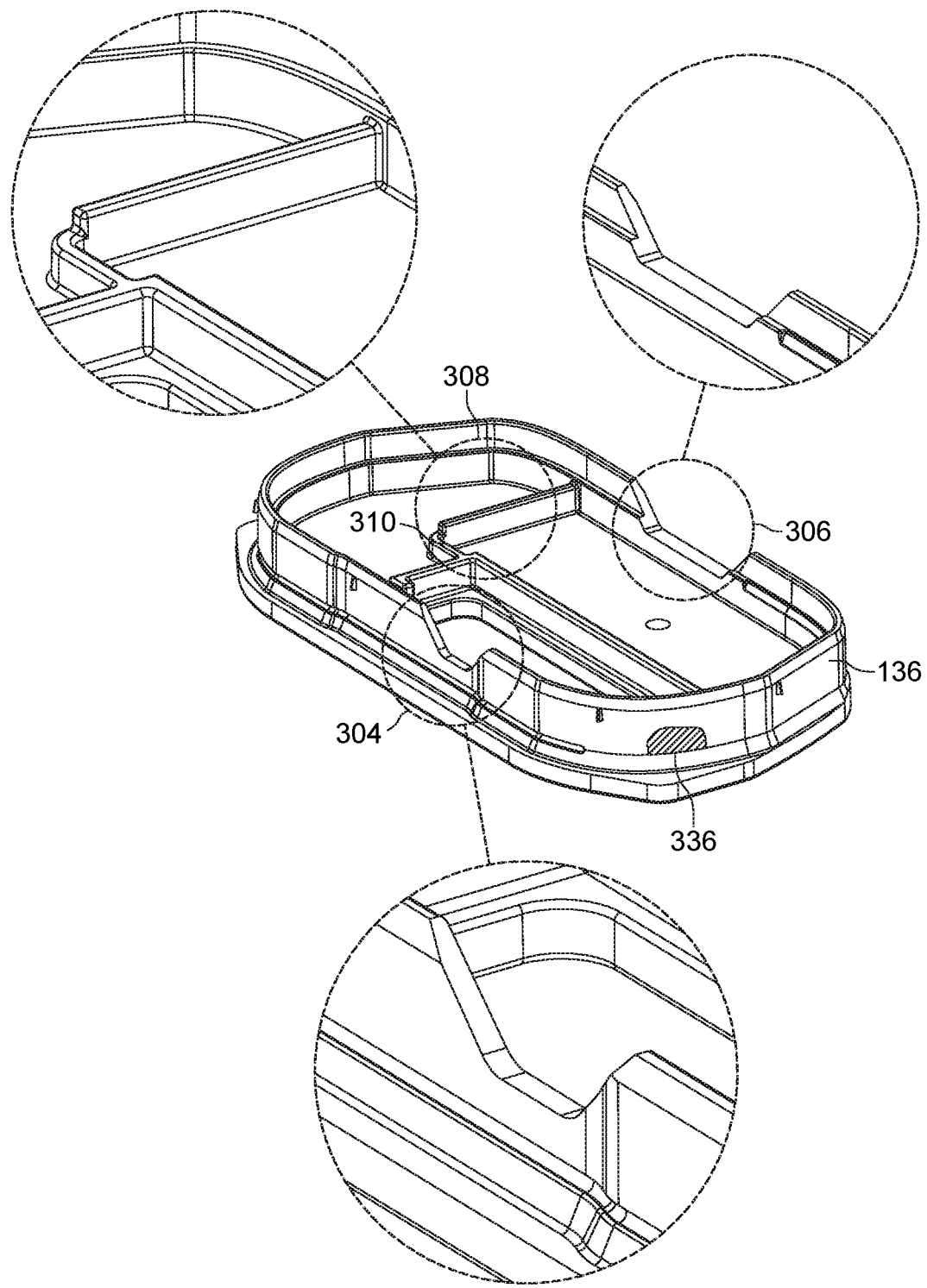

FIGS. 3A and 3B show exterior and interior views of the endcap 130 for the battery pack 100 in accordance with some embodiments. The endcap 130 is used to form the top surface 104 of the battery pack housing 100 as was shown in FIG. 1A. A second UV glue is disposed along a perimeter rim 136 of the endcap 130 to form an endcap perimeter rim of UV glue 336 having a second viscosity level lower than the first viscosity level of the dam 206 thereby providing proper wetting enabling sufficient structural bonding between the endcap 130 and the housing 102. The endcap perimeter rim 136 of UV glue bonds and seals the outer perimeter rim 136 of endcap 130 to the top end of the housing 102 of FIG. 1B.

In accordance with some embodiments, the endcap 130 comprises a walled aperture 302 for alignment of the connector 120 of FIG. 2. The endcap 130 further comprises the fill port 134 and a plurality of flow directors including first and second recessed flow directors 304, 306, and a protrusion flow director 308 provided by the walled aperture 302. Hence, the walled aperture 302 serves several purposes in that it provides alignment for the connector 120 and also operates as a protrusion flow director 308 and further comprises its own recessed flow director 310.

The plurality of flow directors 304, 306, 308, and 310 control the flow of potting compound into three zones, the first zone being the first surface 128a of the pcb 126 (of FIG. 1B), the second zone being a front side of the cell pack and the third zone being a back side of the cell pack. The first flow director 304 has a recessed geometry located on a perimeter rim 136 of the endcap 130. The second flow director 306 has a recessed geometry located on the perimeter rim 136 of endcap 130 opposite the first flow director 304. The third flow director is provided by an interior protruding wall 308 formed within the endcap 130. This interior protruding wall 308 also forms the walled aperture 302 which is used for alignment of connector 120 of FIG. 1B. The fill port 134 is aligned between the first and second flow directors on the top surface of the endcap 130.

The location of the fill port 134 and plurality of flow directors 304, 306, 308, and 310 are optimized to achieve consistent water sealing using an injected potting compound (shown later). The location of the flow directors 304, 306, 308 allow the potting compound injected through the fill port 134 to cover the first surface 128a of the pcb 126 without intruding past the dam of UV glue 206 surrounding the connector 120. The potting compound is further guided via flow director recess 310 into the walled aperture 308 thereby encapsulating the exterior side walls of connector 120 by filling the space between the walled aperture and the connector 120. In addition to encapsulating the pcb, 126, the recessed geometries of flow directors 304, 306 enable potting compound to encapsulate all surrounding surfaces of the cellpack, thereby providing additional sealing and robustness to the battery pack.

FIGS. 4A and 4B show cross sectional views (FIG. 4B has been enlarged to show greater detail) of the battery pack of FIG. 1A in accordance with some embodiments. The dam of UV glue 206 surrounds the perimeter of the connector 120. The high viscosity of the dam of UV glue 206 surrounding the connector 120 blocks the intrusion of the potting compound 402 into the connector 120. The potting compound 402 is injected via fill port 134 and may be, for example, a low pressure mold (LPM) potting compound, or other encapsulants having sufficient flow characteristics. The second UV glue disposed along the perimeter rim 136 of the endcap 130 forms the endcap perimeter rim of UV glue 336 having a second viscosity level lower than the first viscosity level of the dam 206. The endcap perimeter rim of UV glue 336 bonds and seals the endcap 130 to the top end of the battery pack housing 102. The potting compound 402 encapsulates the first surface 128a of the pcb 126 along with the components 202 disposed thereon, surrounding sides the connector 120, and into the housing and up into the interior surface of the endcap 130, and along side surfaces of the cellpack. The pad 142 is situated between the cell pack 140 and the pcb 126 protecting the components 204 on the second surface 128b of the pcb 126 as well as further preventing potting compound 402 from entering cell vents of the battery pack.

Figure 5:
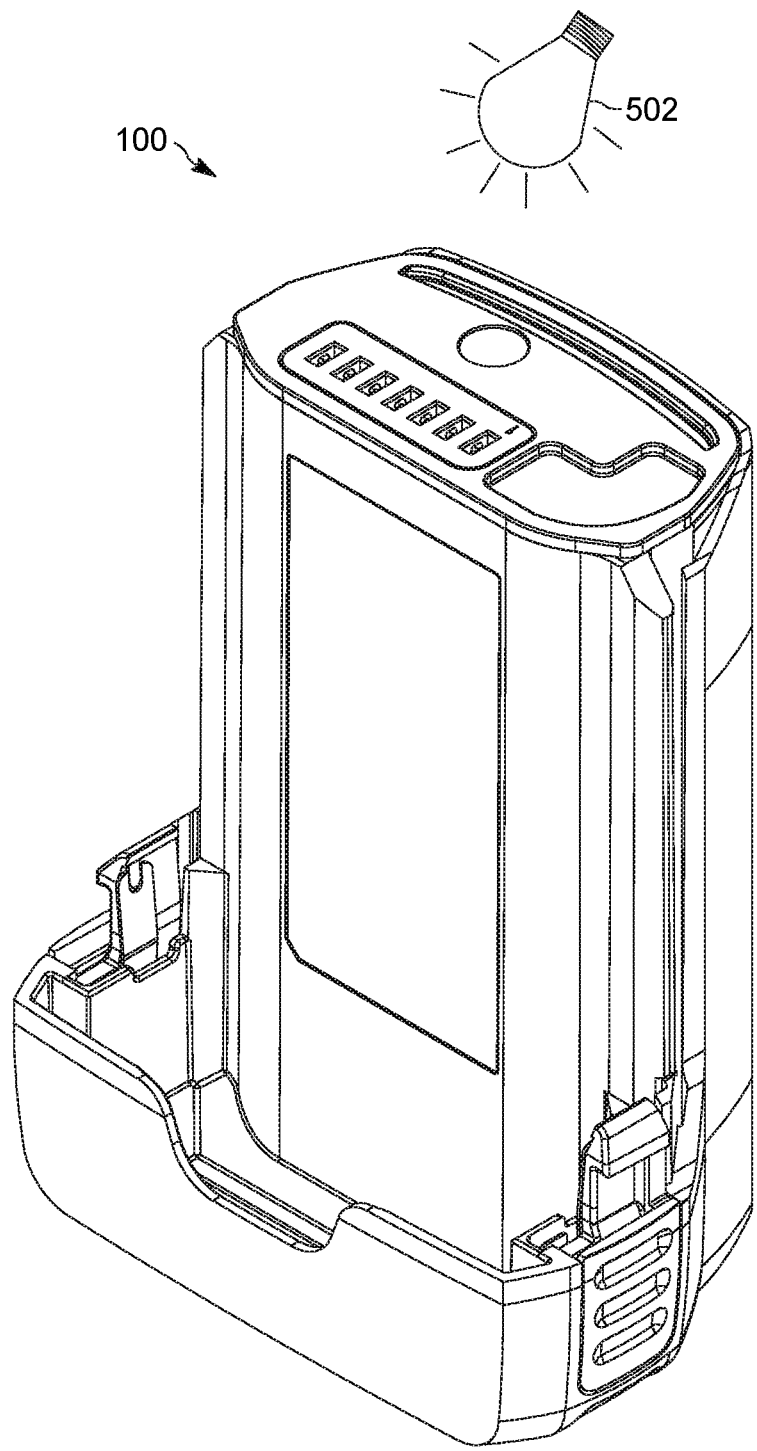
FIG. 5 shows a UV light being applied to the battery pack formed in accordance with some embodiments.

FIG. 5 shows an ultraviolet (UV) light 502 being applied to the battery pack 100 formed in accordance with some embodiments. The UV light 502 cures the dam of UV glue 206 having a first viscosity level, thereby sealing the connector 120 to the first surface 128a. The UV light 502 also cures the endcap perimeter rim of UV glue 336 thereby bonding the endcap 130 to the housing 102. The potting compound is injected via fill port 134 after curing to fill the endcap 130 and seal the connector 120, as described in FIGS. 4A and 4B.

The battery interface assembly provided by the various embodiments avoid the use of ultrasonic welding of the endcap which provides advantages such as 1) reduction of perimeter wall thicknesses, thereby enabling a smaller overall product size 2) Enables bonding of complex and multi planar geometry, and 3) eliminates U/S energy from being transferred to sensitive electronic components. While cantilever spring battery contacts have been used in past designs to bring power from the removable battery pack to a printed circuit board (PCB) located in the device, such contacts take up valuable real estate in an already space constrained battery pack. Contact bounce and the ability to transfer high power from the battery to the device are important considerations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery pack, comprising:
   a battery pack housing for encasing a cell pack;
   a printed circuit board (pcb) having first and second surfaces, the first surface having electronic circuitry and a connector disposed thereon, the electronic circuitry being electrically coupled to the cell pack;
   a first UV glue disposed on the pcb forming a dam of UV glue surrounding a perimeter of the connector, the dam of UV glue having a first viscosity level;
   an endcap forming a top surface of the battery pack housing, the endcap comprising:
      a fill port;
      a plurality of flow directors;
   a second UV glue disposed along a perimeter rim of the endcap forming an endcap perimeter rim of UV glue having a second viscosity level lower than the first viscosity level of the dam, the endcap perimeter rim of UV glue sealing the endcap to the battery pack housing; and
   a potting compound injected through the fill port and guided by the flow directors to cover the first surface of the pcb thereby providing a seal to the electronics and the connector.

2. The battery pack of claim 1, wherein the endcap is sufficiently transparent to pass ultraviolet (UV) light.

3. The battery pack of claim 1, wherein the endcap is a sufficiently transparent to pass ultraviolet (UV) light to cure the dam of UV glue surrounding the perimeter of the connector and to cure an outer perimeter rim of the endcap to a top end of the housing.

4. The battery pack of claim 1, further comprising electronic circuitry disposed on the second surface of the pcb.

5. The battery pack of claim 4, further comprising a pad situated between the cell pack and the pcb.

6. The battery pack of claim 5, wherein the pad is shaped to accommodate the electronic circuitry disposed on the second surface of the pcb.

7. The battery pack of claim 5, wherein the pad prevents the potting compound from entering a vent associated with each cell of the cell pack.

8. The battery pack of claim 1, wherein the connector is a spring connector comprising spring contacts within a spring contact receptacle.

9. The battery pack of claim 8, wherein the spring connector is an unsealed connector.

10. The battery pack of claim 1, wherein the dam of UV glue surrounding the perimeter of the connector blocks intrusion of the potting compound into the connector.

11. The battery pack of claim 1, wherein the potting compound encapsulates the first surface of the pcb, exterior side surfaces of the connector and housing to the endcap.

12. The battery pack of claim 1, wherein the plurality of flow directors are formed of at least two recessed geometries to direct the flow of the potting compound and one interior protrusion geometry to prevent the flow of the potting compound.

13. The battery pack of claim 12, wherein the plurality of flow directors control the flow of potting compound to encapsulate the first surface of the pcb and surrounding surfaces of the cellpack.

14. The battery pack of claim 13, wherein:
a first flow director has a recessed geometry located on a perimeter rim of the endcap;
a second flow director has a recessed geometry located on the perimeter rim of the endcap opposite the first flow director;
and
a third flow director comprises an interior protruding wall formed within the endcap.

15. The battery pack of claim 14, wherein:
the recessed geometry of the first flow director located on the perimeter wall of the endcap enables potting compound on a first cell pack surface, including side surfaces;
the recessed geometry of the second flow director located on the opposite perimeter wall of the endcap enables potting compound on a second cell pack surface, including side surfaces;
and
the interior protruding wall formed within the endcap comprising a third recess for guiding potting compound around exterior walls of the connector while preventing potting compound intrusion into contacts of the connector.

16. The battery pack of claim 1, wherein the dam of UV flue having the first viscosity level comprises a polymer glue having a thickness sufficient to block intrusion of the potting compound.

17. The battery pack of claim 16, wherein the endcap perimeter rim of UV glue sealing the endcap to the housing comprises a polymer glue having a predetermined thickness less than the thickness of the dam of UV glue.

18. The battery pack of claim 1, wherein the endcap includes a walled aperture surrounding the connector and also acts as a flow director.

19. The battery pack of claim 18, wherein the walled aperture comprises a recess that allows potting compound to surround exterior walls of the connector while the dam of UV glue prevents the potting compound from intruding into the connector.

20. The battery pack of claim 1, wherein the fill port is aligned between first and second flow directors on a top surface of the endcap.

* * * * *